Jan. 11, 1955
D. M. FINCH
2,699,086
MEANS FOR MEASURING PHYSICAL BRIGHTNESS
AND PHYSICAL BRIGHTNESS RATIOS
Filed May 22, 1950
2 Sheets-Sheet 1
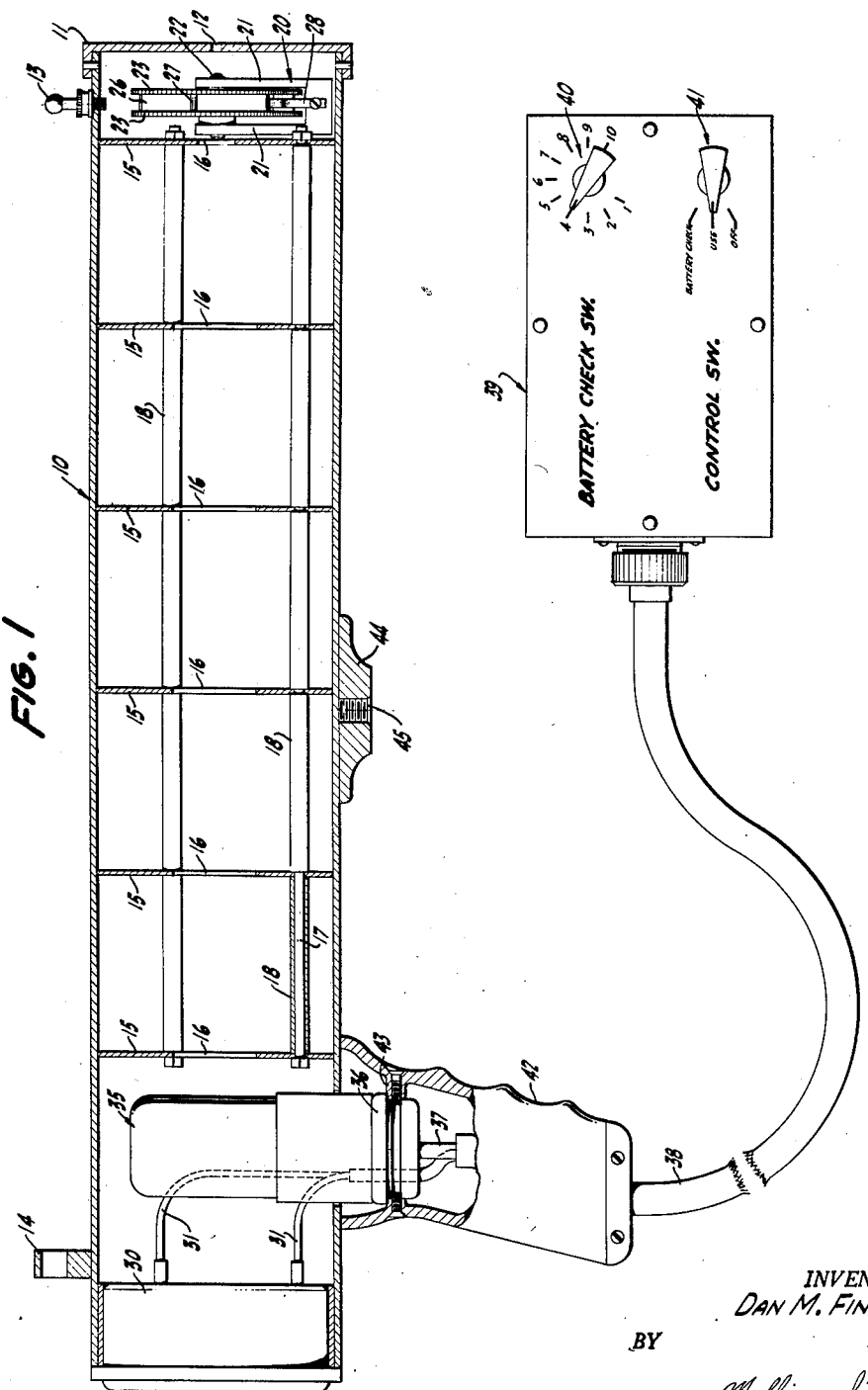
INVENTOR.
DAN M. FINCH
BY
*Mellin and Hanscom*
ATTORNEYS Jan. 11, 1955     D. M. FINCH     2,699,086
MEANS FOR MEASURING PHYSICAL BRIGHTNESS
AND PHYSICAL BRIGHTNESS RATIOS
Filed May 22, 1950     2 Sheets-Sheet 2
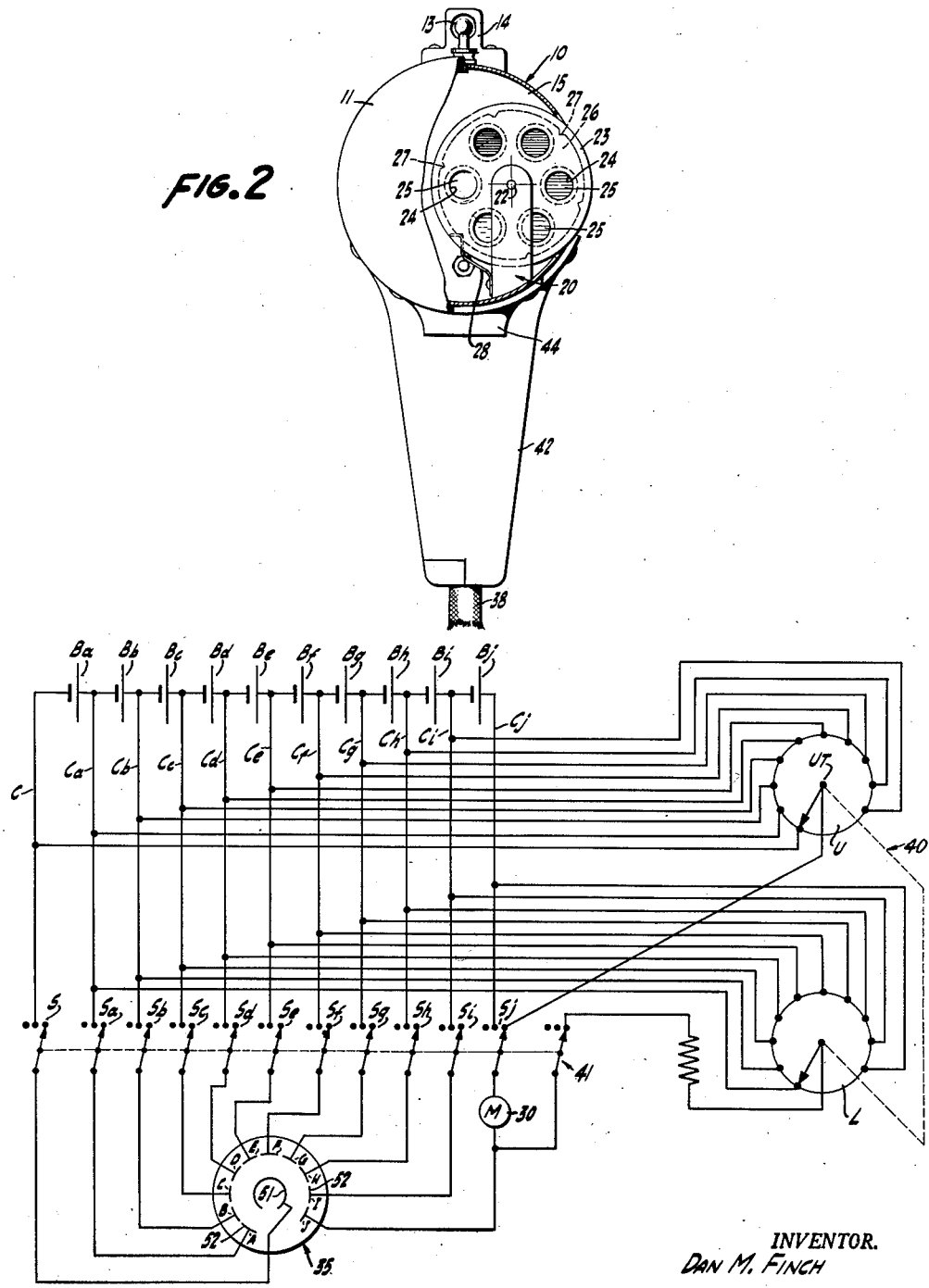
INVENTOR.
DAN M. FINCH
BY
*Mellin and Hanson*
ATTORNEYS

United States Patent Office 2,699,086
Patented Jan. 11, 1955

2,699,086

MEANS FOR MEASURING PHYSICAL BRIGHTNESS AND PHYSICAL BRIGHTNESS RATIOS

Dan M. Finch, Berkeley, Calif., assignor to The Regents of The University of California, Berkeley, Calif.

Application May 22, 1950, Serial No. 163,527

1 Claim. (Cl. 88—23)

This invention relates to a meter for measuring physical brightness and brightness ratios.

While the apparatus of the present invention has a wide field of usefulness in the studies of illumination and optics as well as in connection with photography it is particularly adapted for use in making comparative brightness tests in conjunction with air pollution by smoke wherein it is desired to determine the degree of attenuation of light by black or neutral opaque smoke particles. One specific application of the present inventive concept is in connection with brightness ratio studies of highway smoke pollution.

Smoke emitted by motor vehicles on the highway has long been recognized as a hazard to safe operation. It is also one of the principal sources of annoyance and discomfort to vehicle operators, pedestrians and other persons in congested areas. Consideration of the problem as a whole indicates that there are two fundamental aspects that need to be differentiated:

1. The reduction in visibility of objects caused by smoke.
2. The annoyance, discomfort, and damage caused by the solid or liquid smoke particles.

The reduction in the visibility of objects caused by smoke particles in the path between the observer and the object is of paramount importance in the safe operation of motor vehicles. The visual sense is responsible for approximately 85 percent of the brain stimulation relating to body reaction, muscular coordination, and reflux actions that are used in driving. When perception distances are reduced, contrasts changed, and visual acuity lessened by the scattering and absorption of light by smoke particles the driving task is made very much more difficult.

Various state and local governments have enacted restrictions on such air pollution and have imposed fines where such pollution is believed to be an inexcusable hazard and nuisance. However, great difficulty has arisen due to the fact that no standard of measurement to accurately determine the degree of density of smoke and the degree of light absorption by the smoke exists. By use of the present method and apparatus an immediate and accurate determination of the degree to which the smoke has attenuated the light may be had so that enforcement officers will not be dependent upon mere visual comparisons. In order to evaluate the smoke emitted by vehicles it is necessary to first decide upon the criteria to be used for measuring the smoke; second, to devise equipment with which to make the measurements; and third, to establish standards for densities of smoke.

One of the primary objects of this invention is the provision of a brightness meter by which the degree of physical brightness may be determined and by which brightness ratios may be established.

A further object of the present invention is to provide a meter for determining the relative brightness of a scene unobstructed by smoke and of a scene as viewed through smoke whereby the density of the smoke may be readily determined by suitable calibration and numerical figures may be established to accurately indicate the relative light attenuation by various smoke clouds.

Another object of the present invention is to provide a novel and improved portable apparatus by which brightness may be directly measured and read as a numerical figure.

Numerous other objects and features of the present invention will be apparent from a consideration of the following specification taken in conjunction with the accompanying drawings, in which:

Fig. 1 is a vertical longitudinal section of the brightness meter of the present invention;

Fig. 2 is a front elevation of the meter shown in Fig. 1, being partly broken away; and Fig. 3 is a wiring diagram illustrating the electrical circuit employed in the meter.

In general terms the present invention involves subjecting a photo-responsive medium to light emanating from the source of which the physical brightness is to be determined and measuring the effect of such light upon such photo-responsive medium. However, in order to provide a standard and accurate reading for various brightness measurements, the method provides for the subjection of the photo-responsive medium to a standard cone of light from the source of brightness which is determined by a fixed solid angle and the method further provides for the use of intermediate light filters which may be selected to provide a series of brightness scale measurements, which series may be correlated so as to provide an accurate determination of the relative brightness of a reading in one series with respect to a reading in another series. My invention also contemplates the use with a photoelectric cell of a photomultiplier so as to secure an accurate visible reading on an ammeter whereby ratios may be determined between the brightness without smoke and the amount of diminution of such brightness by smoke.

The apparatus of the present invention may be generally defined as a light tube provided with a photo-responsive means. However, in order to obtain the accuracy above referred to, the tube has a restricted light entrance and a plurality of baffles so as to limit the light source affecting the photoelectric cell to a definite solid angle. At the light admitting aperture there is provided a plurality of variously graduated light filters which may be selectively moved in registration with the light aperture so as to diminsh the reading of the photoelectric means, thus to provide various scales which may be correlated. In the form of the present invention here shown the meter is a portable device which may be readily carried upon the person and which has sighting means so as to assist in the accurate aiming of the device to the field desired. It will, of course, be understood that the device may be fixed and a pedestal support is provided therefor. It will also be understood that the readings of the ammeter may be recorded so as to provide a permanent record of the brightness measurements if desired.

Referring more particularly to the drawings, the numeral 10 indicates the elongated cylindrical barrel of the brightness meter which is closed at the forward end by a cap-like closure 11 having a small, centrally located, light-admitting aperture 12. Mounted on top of the barrel 10 there are forward and rear sights 13 and 14 respectively, which provide for ready aiming of the meter towards an area, the brightness of which is to be determined.

The inner surface of the cylindrical barrel 10 is preferably painted or otherwise colored black so as to preclude light reflection therein and throughout the length of the barrel there is provided a plurality of centrally apertured baffles 15, the central apertures 16 of which are in registration with the light admitting aperture 12 of the end cap 11. The baffles 15 are suitably secured in equally spaced arrangement within the barrel 10 as by stay-rods 17 and intermediate spacers 18.

At the forward end of the barrel and preferably located between the end cap 11 and the first baffle 15 there is provided means for selectively registering light filters with the aperture 12, such means includes a bifurcated bracket 20 fixedly secured to the lower portion of the inner wall of the barrel 10 and extending upwardly therefrom. Between the upwardly extending furcations 21 of the bracket 20 and in line with the center of the aperture 12 but horizontally displaced with respect thereto there is provided a longitudinally extending pintle pin 22. Upon the pin 22 is mounted a pair of spaced discs 23 having registering apertures 24 between which are mounted graduated light filters indicated by the numeral 25 mounted within a central circular body 26. The horizontal displacement of the axis of the discs with respect to the aperture 12, the diameter thereof and the location of the filters 25 is such that each filter may be selectively positioned in direct alignment with the aperture 12 so that light passing therethrough is modified by the filter selected. As more clearly indicated in Fig. 2 a side of the barrel is slotted to receive one portion of the periphery of the discs therethrough so that the discs may be readily rotated manually, the disc edges being preferably knurled to assist such manipulation. In order to accurately locate the selected filter in registration with the aperture 12, the body 26 is notched as indicated at 27. A spring detent finger 28 is provided secured to the bracket 20 with its end arranged to yieldably engage the body 26 so as to be received in successive notches as they register therewith. Thus the disc filters are secured against accidental displacement after registration of the selected filter with the aperture 12.

The rear end of the cylinder 10 is closed by having mounted therein an ammeter 30 which is suitably arranged in the electrical circuit illustrated in Fig. 3 as indicated. By such location of the ammeter it will be readily seen that its reading may be instantly observed while the barrel is being aimed by means of the sights 13 and 14. Suitable conductors 31 are provided to arrange the ammeter in the circuit.

In front of the ammeter 30 and to the rear of the last baffle 15 there is mounted a photoelectric cell 35 supported in a suitable socket 36 and arranged in the electrical circuit shown in Fig. 3 by means of conductor 37. As indicated in Fig. 3, the preferred photoelectric cell used is known as a photomultiplier and is preferably of the type identified as RCA 931 A, the function and operation of which will be described in detail in connection with the description of the electrical circuit. As indicated, the conductors 31 and 37 merge into a cable 38 which leads to a battery and control box identified by the numeral 39, which box is provided with a battery check switch indicated at 40 and a control switch indicated by the numeral 41.

For providing ready manipulation of the meter, a pistol grip 42 is provided therefor, the grip being hollow to receive the conductors 31 and 37 and being provided at its upper end with a suitable bracket 43 which receives and supports the socket 36 of the photoelectric cell 35.

The barrel may also be provided with a suitable bracket 44 mounted on the lower side of the barrel substantially midway of its length and provided with a bore 45 which is adapted to receive a suitable supporting means such as a tripod when it is desired to mount the meter in a fixed location.

With the apparatus of Fig. 1, it will be seen that the photo-sensitive area of the tube 35 is subjected only to the light flux of a cone of light entering through the aperture 12 and modified by the selected filter, if any, insinuated between the aperture and the photoelectric cell. The distance between the aperture 12 and the photoelectric cell, together with the size of the aperture 12 will determine a fixed angle. Since the solid angle is thus fixed, the light flux admitted will be in direct proportion to the brightness of the field towards which the meter is aimed. Thus relative brightness may be directly noted by aiming of the meter successively to the areas to be compared and observing the readings of the ammeter. It may, of course, be found that in many instances the ammeter reading for brightness measured through a cloud of smoke will not be appreciable when measured through the same filter used to measure the background brightness, and in order to compensate therefor a different light filter may be positioned in registration with the aperture and the ammeter reading will, therefore, be suitably modified so as to provide an accurate comparative amperage reading for the brightnesses measured.

Referring now to the wiring diagram of Fig. 3, the photomultiplier tube 35 includes the photo-responsive central element 51 and a series of 10 successive elements 52 identified by the letters A to J inclusive. In conjunction therewith, there is provided a series of ten batteries identified by the letters $Ba$, $Bb$, etc., the positive side of each battery being arranged for connection with its similarly identified element of the tube 35 through conductors $Ca$, $Cb$ and $Cc$, etc., through switches $Sa$, $Sb$, $Sc$, etc. The batteries are arranged in series, the negative side of the first battery being connected through a conductor C and the switch S to the central element 51 of the tube 35. It will, of course, be noted that the positive side conductor of battery $Ba$ is also the negative lead of the battery $Bb$, etc. Arranged between the positive conductor $Cj$ of battery $Bj$ and element J of the tube 35, there is provided the ammeter 30 shown in Fig. 1.

In the operation of the device as a brightness meter, with the switches S and $Sa$ to $Sj$ inclusive which are controlled by the switch 41 of Fig. 1, closed to complete the circuits to the conductors C and $Ca$ to $Cj$, each of the elements A to J is in circuit with its individual battery with the tube gas included in such circuit. When light affects the central element 51 of the tube, it discharges energy across the path of potential formed by the first battery $Ba$ between the element 51 and the element A and the current flow is proportioned to the amount of light which reaches the element 51. Current so induced is passed from element A to B, B to C and C to D, etc. and in each such passage accumulated potentials of the batteries are inserted so that the effect is to vastly multiply the current originally caused to flow by the receipt of light by the photoelectric element. Such multiplied current flow is directly readable on the ammeter 30 and thus there is provided a direct ammeter reading commensurate with the amount of light which reaches the photoelectric element.

In order to be sure that the readings are constant with respect to the amount of light reaching the photoelectric element at different times, it is desirable to frequently check the potential of the batteries so as to be sure that in each reading the battery efficiency is the same and that the amount of multiplication is, therefore, the same. For this purpose, there is provided a pair of rotary battery check switches which are mounted on the same shaft, to be rotated together by the switch 41 of Fig. 1. These switches include the upper switch U connected at ten points with the conductors C and $Ca$, $Cb$, $Cc$, etc., exclusive of the conductor $Cj$. The central terminal U. T. for the switch U is connected through the switch $Sj$ in order to put the voltmeter 30 in series with the upper switch. The lower switch L is connected through a conductor and resistance to the opposite side of the ammeter and is similarly provided with ten contact points which are connected to the positive side of the batteries through connection with the conductors $Ca$, $Cb$, $Cc$, etc. When it is desired to check the batteries, the switch 41 is thrown to disconnect the elements of the tube from the batteries and the meter is thrown in circuit with the switches in the manner indicated. Thereafter as the contactors of the upper and lower switches move from the first to the second and then to the third contacts, etc. of the switches, the first, second, third, etc. batteries $Ba$, $Bb$, $Bc$ are cut into the circuit in succession and their potential may thus be successively read directly on the ammeter 30, thus providing for a ready check of the battery potential at any time.

In the use of the present invention for comparative tests of brightness, the potentials of the batteries are first checked in the manner above referred to and such potentials may be noted for future calculations. The switch on the control box is then turned to throw the switches S and $Sa$, $Sb$, $Sc$, etc. into contact for supplying the elements of the tube and also throwing the ammeter across the line of the last battery $Bj$. The meter is then aimed at any desired object or locale with respect to which the emanations of light are to be calculated and such emanations are directly read upon the ammeter. Assuming that the original "shot" is taken without any of the filters arranged in line with the aperture 12, it may be possible that the ammeter reading is in excess of that for which the meter is calibrated. In such case, the discs are rotated so as to bring the light filters into successive position behind the aperture 12 until such time as a readable value is found on the ammeter. Such reading adjusted in accordance with the filter selected will give a numerical reading for the brightness tested. When the device is to be used with respect to determining the amount of smoke generated by a motor vehicle, one or more readings are taken in order to secure a value for the brightness of the background as seen without light attenuation by smoke. After having calculated such background brightness, a reading is then taken with the instrument pointed directly at the smoke. On the assumption that the background brightness is substantially uniform, it will, of course, be obvious that any diminution of the reading from the average of the uniform background will be due to attenuation of light by the smoke and will thus be a direct reading of the density of the smoke and will indicate the degree of absorption by the smoke of the light energy from the background.

It is thus obvious that the present invention provides a novel and improved means by which physical brightness may be measured and means and apparatus by which relative brightness may be calculated and provides apparatus by means of which the density of smoke may be calculated with respect to the effect of such smoke on visibility.

Numerous changes and modifications and the full use of equivalents may be resorted to in the practice of the invention without departing from the spirit and scope of the invention as outlined in the appended claim.

Having thus described my invention, what I claim and desire to secure by Letters Patent is:

An apparatus for measuring light, which includes a hollow tube having an internal black surface and enclosed at both ends, the closure for one end of said tube having a central aperture therein, the closure for the other end of said tube comprising an ammeter, a series of centrally apertured baffles within said tube intermediate the ends thereof, a photoelectric multiplier tube in one end of said tube, a plurality of light filters at the opposite end of said tube, means to selectively insert said filters between the aperture of said end and said photoelectric multiplier, tube means for manually training said tube to permit a cone of light from a selected source to enter said tube and impinge upon said photoelectric multiplier, said ammeter being in circuit with said photoelectric multiplier tube thereby to measure the discharge thereof.

References Cited in the file of this patent

UNITED STATES PATENTS

| Number | Name | Date |
|---|---|---|
| 1,546,264 | Story | July 14, 1925 |
| 1,556,766 | Ybarrondo | Oct. 13, 1925 |
| 1,969,626 | Simon et al. | Aug. 7, 1934 |
| 2,154,374 | Byram | Apr. 11, 1939 |
| 2,198,971 | Neufeld | Apr. 30, 1940 |
| 2,244,507 | Thomas | June 3, 1941 |
| 2,308,469 | McMaster | Jan. 12, 1943 |
| 2,419,914 | Pamphilon | Apr. 29, 1947 |
| 2,478,163 | Sweet | Aug. 2, 1949 |
| 2,498,506 | Ramser | Feb. 21, 1950 |